Patented Aug. 4, 1953

2,647,878

UNITED STATES PATENT OFFICE 2,647,878

PROCESS OF PROMOTING POLYMERIZATION

Max M. Lee, Washington, D. C.

No Drawing. Application June 15, 1950,
Serial No. 168,373

10 Claims. (Cl. 260—45.4)

1

This invention relates to a new series of catalysts and accelerators and a process of polymerizing reactive unsaturated resins and monomers in the presence of the new catalysts and accelerators. More particularly this invention is concerned with the utilization of heterocyclic secondary or tertiary amines specifically as a class for the polymerization of ethylenic compounds and the copolymerization of a modified or unmodified polyhydric alcohol ester of an unsaturated polycarboxylic acid (hereinafter for brevity designated generally as an "unsaturated alkyd resin") and at least one organic substance which contains the polymerizably reactive group

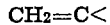

$$CH_2=C<$$

and/or contains the allyl or methallyl group of the following general structure

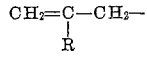

$$CH_2=C-CH_2-$$
$$\phantom{CH_2=C}|\phantom{CH_2}$$
$$\phantom{CH_2=C}R$$

where R is hydrogen or a simple alkyl radical.

This application is a continuation-in-part of application Serial No. 571,013, filed January 1, 1945 now abandoned and Serial No. 665,645, filed April 27, 1946, now abandoned.

The aromatic amines are considered as anticatalysts (inhibitors) when present in solutions of unsaturated alkyd resins and/or vinyl and allyl monomers. A majority of the patents that discuss poisons or anticatalysts in the polymerization of reactive unsaturated compounds usually mention aromatic amines as one of a group of preferred inhibitors. It is, therefore, surprising and unexpected that when solutions of ethylenic compounds or of unsaturated alkyd resins with at least one vinyl or allyl monomer are copolymerized in the presence of a small amount of heterocyclic secondary or tertiary amine that instead of the polymerization being inhibited, it is greatly increased so that not only a much smaller concentration of catalyst in comparison to the preferred peroxide catalyst is necessary but the time necessary to yield a hard polymer or copolymer is much shorter. Also, when the polymerization reaction is carried out both in the presence of a small amount of peroxide catalyst and a heterocyclic secondary or tertiary amine, the polymerization usually proceeds without the application of heat in a shorter time than if elevated temperatures were used in the absence of the said amines.

An object of this invention is to provide a new series of polymerization catalysts and accelerators for the polymerization of ethylenic compounds of the vinyl or allyl monomers.

Another object of this invention is to provide

2 a process for the polymerization of ethylenic compounds and of solutions of unsaturated alkyd resins in ethylenic compounds without the external application of heat.

A further object of this invention is to considerably reduce the time in carrying out the polymerization reaction.

Still another object is to considerably reduce the quantity of peroxide catalyst necessary to bring about the polymerization reaction since there is a potential danger in handling large quantities of the unstable peroxide catalysts.

These and many more advantages will become apparent in the following discussion and examples.

The amines which are added as catalysts or accelerators in the polymerization reaction according to the present invention have the following general formula:

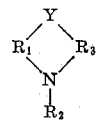

where $R_1$ is an aromatic nucleus of the group consisting of phenylene and naphthylene radicals; $R_2$ is a radical selected from the group consisting of hydrogen, hydroxyalkyl, alkyl, halogen alkyl or tertiary amine alkyl; N is nitrogen; Y is oxygen, nitrogen or carbon and is attached to $R_1$ in a position ortho to the nitrogen, N; and $R_3$ is an alkylene radical of the group consisting of methylene, ethylene or isopropylene radicals. The preferred group of compounds are those which contain an $R_2$ group attached to a tetrahydroquinoline, or phenomorpholine structure. The amine may be part of a dye component so that colored plastics are obtained as well as the catalytic and accelerating effect. The catalytic effect is even more pronounced when the amines are used in the presence of a peroxide catalyst such as benzoyl peroxide.

The concentration of catalyst or accelerator that is used in the polymerization process depends upon a number of factors such as the amine employed, the constitution and proportion of the vinyl monomers or of the unsaturated alkyd resin to the reactive vinyl or allyl monomers, the concentration of inhibitor present, the concentration of peroxide catalyst if used, and the temperature at which the polymerization reaction is to be carried out.

In general the concentration of the tertiary aromatic amine employed is extremely small and may vary from 0.001% to 1.0% based on the weight of the resin present. However, I prefer to use concentrations varying from 0.01% to 1.0%. Each heterocyclic amine has a limit to the amount which can be employed depending upon the other above-mentioned factors. When concentrations much above the limit are employed, the heterocyclic amine may actually behave as an inhibitor instead of an accelerator.

It has been proposed to accelerate the polymerization of ethylenic compounds and the copolymerization of unsaturated alkyd resins with ethylenic compounds by dissolving the catalysts, usually a peroxide type such as benzoyl peroxide, in said mixtures and heating or exposing to light of short wave length. When heat is applied, considerable time is necessary to bring the temperature of the reactive liquid monomers to the polymerization temperature especially when the container consists of a low heat conductive material such as wood, rubber, or glass, or when large qualities of resin are to be polymerized. In order to increase the polymerization rate to a practical time for many commercial applications it is often desirable to employ the highest temperature possible. However, the temperature is limited to the boiling points of the monomers present so that in many cases where such monomers as vinyl acetate, acrylonitrile, or the lower acrylic esters are to be polymerized with the unsaturated alkyd resins the applied temperature usually must not exceed 70 degrees C. to 80 degrees C., and the temperatures of 50 degrees C. to 60 degrees C. must often be employed to obtain bubble-free and fracture-free masses. When polymerization is carried out at these elevated temperatures, the heat of reaction being highly exothermic, in conjunction with the temperatures of the resin just before final polymerization sets in is such that froth-like masses often occur because the resulting temperature exceeds the boiling points of the low-boiling vinyl and acrylic monomers. Also, because of the high heat involved during the final polymerization many fractures result because of internal strains and the weakened condition of the polymer at these elevated temperatures. It is, therefore, desirable to bring about the polymerization reaction at the lowest possible temperature so that bubble-free and fracture-free masses result. Since the polymerization rate is considerably reduced when lower temperatures are employed, it is often commercially impractical to prepare polymerized masses or castings under such conditions. As a result, many vinyl monomers and resin solutions consisting of unsaturated alkyd resins and vinyl, acrylic, and/or allyl monomers are not polymerized in thick sections but usually as a film or in the presence of fillers so that the heat generated is absorbed by the surrounding inactive substances. However, when the proper concentration of tertiary aromatic amines is used in conjunction with peroxide catalysts, the copolymerization can be carried out at room temperature. At the final stage of polymerization, the heat generated by the exothermic reaction is usually not sufficient to cause fractures or bubbles unless very large castings are made.

There has long been a need for a relatively inexpensive, readily producible, efficient catalyst for the polymerization of ethylenic compounds. Such catalysts should be readily dispersible or soluble in the material to be polymerized. There should be no explosive hazards in its manufacture or use. It should have good storage stability. It is particularly desirable to have a catalyst which is a liquid, since dissolving or dispersing the catalyst in the polymerizable material is facilitated. The catalyst should be particularly active so that small quantities are necessary to bring about the polymerization reaction. The catalyst should be water insoluble or non-hygroscopic so that its presence in the polymer would not affect its physical and electrical properties. Also, the catalyst should not leave objectionable odors in the polymer thereby considerably limiting its applicability.

Aliphatic amines of which triethanolamine and triisopropanolamine and certain nitrogen heterocyclic compounds, for example, pyridine, quinoline, and picolines, have been proposed as "promoters" or accelerators for the polymerization of ethylenic compounds in the presence of organic peroxide catalysts. In general, concentrations of about 10% of such compounds based on the weight of the ethylenic monomers are necessary to bring about polymerization within a reasonable time. Such high concentrations materially affect the physical properties of the resulting polymer especially when these amines are water soluble and hygroscopic. These aliphatic and nitrogen heterocyclic amines are unmiscible with many of the ethylenic compounds such as styrene, vinyl acetate and methyl methacrylate, in the concentration necessary to bring about polymerization wtihin a reasonable time. Also, many of these "promoters" that are miscible with the monomer often are incompatible with the polymer resulting in an opaque product. Because of their viscous nature or tendency to solidify, triethanolamine and tri-isopropanolamine are difficult to disperse in the ethylenic compounds.

In contrast, the heterocyclic amines of this invention are so effective a catalyst that the presence of an organic peroxide is not required in many of the polymerization reactions. These secondary and tertiary amines are so reactive that concentrations as low as 0.1% to 0.3% are sufficient to bring about polymerization without the presence of an organic peroxide. Such small amounts have very little effect on the physical and electrical properties of the resulting polymer. Because of the low concentrations involved, the final polymer is much stronger, harder, and unaffected by water and humid climates. Also, the heterocyclic amines of this invention are completely miscible both in all the monomers tested as well as the resulting polymer. Since they are thin liquids, they are easy to disperse in the ethylenic compounds. Such heterocyclic amines when used in their proper concentration do not leave any objectionable odor in the polymeric mass.

The present invention, therefore, provides polymerization catalysts and accelerators meeting the above requirements. These heterocyclic amines are readily available. All can be heated or distilled without explosion hazards. When used in conjunction with organic peroxides, the concentration of organic peroxide may be so materially reduced that many of the hazards connected with handling large quantities of organic peroxides are greatly reduced or eliminated.

The ethylenic compounds which are polymerized by the tetrahydroquinolines of the present invention have the general formula:

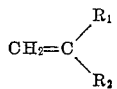

where $R_1$ is a negative group such as aryl, vinyl, ethynyl, carboxyl, halogeno, O-CO-alkyl (acyloxy), CO-O alkyl, alkoxy, nitrilo, or halovinyl. and $R_2$ is hydrogen or an alkyl group.

The modified or unmodified polyhydric alcohol ester of an unsaturated polycarboxylic acid is concerned more particularly with condensation products of a polyhydric alcohol containing two or more hydroxy groups such as in ethylene glycol, diethylene glycol, propylene glycol, glycerine, etc., and an unsaturated polycarboxylic acid (or anhydride) such as maleic, fumaric, tartaric, aconitic, or itaconic acids. The unsaturated alkyd resins may be modified so that saturated polybasic acids may be part of the polyester molecule. Solutions of these modified or unmodified polyesters in at least one other organic compound copolymerizable therewith and containing the structure

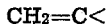

are readily copolymerized in the presence of small quantities of the tertiary amines of the invention. Such vinyl and acrylic monomers as styrene, vinyl acetate, acrylonitrile, methylmethacrylate and the alkyl acrylates readily copolymerize with the unsaturated alkyd resins in the presence of small quantities of the heterocyclic amines of the present invention without the application of heat to give hard to rubbery, transparent and light-colored solids which are insoluble and infusible. Also, the unsaturated alkyd polyesters readily copolymerize with unsaturated compounds of the allyl or methallyl type in the presence of a peroxide catalyst and a small amount of the said heterocyclic amines at elevated temperatures so that shorter gelation and curing cycles are obtained. Examples of such copolymerizable compounds are diallyl maleate, diallyl phthalate, and diallyl sebacate.

In carrying out the polymerization process for unsaturated alkyd resin solutions I prefer to prepare fluid resins so that the tertiary amines may be readily incorporated prior to the polymerization reaction. Small amounts of from 0.1% to 0.05% hydroquinone are incorporated into the liquid resins to prevent these liquids from premature gelation so that the storage life of these resins may be at least six months to one year. A peroxide catalyst such as benzoyl peroxide is then incorporated either by dissolving first in a small quantity of vinyl or allyl monomers or by adding the benzoyl peroxide as a fine powder directly to the liquid resin and agitating until solution is complete. Quantities of from 0.05% to 2% by weight of benzoyl peroxide are added depending upon the constitution of the resin solution and the conditions of the polymerization process. Such solutions are stable at normal room temperatures from two days to several weeks. Prior to the polymerization reaction the heterocyclic amine is added either as a sole component or in a properly diluted inert high-boiling solvent. The resin solution is now in a state where it will polymerize without the application of heat. Under proper conditions the polymerization time is much shorter than when heat is applied in the absence of the said amines of the invention. The liquid resin first gels with only a slight exothermic reaction. This is followed by a gradual rise in temperature so that at the final stages of polymerization considerable heat is generated, although in a large majority of cases no bubbles are formed, fractures may result in thick sections. The color changes usually from a water-white or light yellow to a yellow and in some cases to an amber color when high heat is attained. By controlling the concentration of peroxide catalyst and the heterocyclic amine the reaction may be controlled so that the heat generated is dispersed over a longer period of time resulting in a hard, light-colored solid, free of bubbles and fractures. The following will serve as examples to illustrate the catalytic and accelerating effect of the said heterocyclic amines and the manner in which they are incorporated into the ethylenic monomers and the alkyd resin solutions, but it is to be understood that these examples are set forth merely for illustrative purposes and that other similar heterocyclic amines as defined by the generic formula set forth above are to be considered within the confines of the present invention.

*Example 1*

A polymeric glycol maleate was prepared by heating together 1272 parts of diethylene glycol with 1186 parts of maleic anhydride in an atmosphere of $CO_2$ for 8 hours at an average temperature of 205 degrees C. A light yellow, soluble, sticky resin was obtained.

A clear mobile light-colored liquid was prepared by dissolving this alkyd polyester in a solution of monomeric styrene and methylmethacrylate containing a small amount of hydroquinone. This liquid resin solution had the following composition:

|   | Per cent |
|---|---|
| Diethyleneglycol maleate | 60.000 |
| Styrene monomer | 35.000 |
| Methyl methacrylate monomer | 5.000 |
| Hydroquinone | 0.025 |

To illustrate the catalytic action of amines of the invention the results of experiments adding N-β-hydroxyethyl, 1,2,3,4-tetrahydroquinoline as the catalyst are given below. A 10% solution of this catalyst in dibutyl phthalate was used.

| No. | Catalyst | Conc., percent by wgt. | Temp., °C. | Gel time | Solid Stage |
|---|---|---|---|---|---|
| 1 | N-β-hydroxyethyl-tetra hydroquinoline | 0.06 | 60 | 37 min | 61 min. |
| 2 | do | 0.12 | 60 | 24 min | 60 min. |
| 3 | do | 0.18 | 60 | 23 min | 54 min. |
| 4 | Benzoyl Peroxide | 1.00 | 60 | 195 min | 205 min. |
| 5 | No catalyst | 0.00 | 60 | 7 days | 9 days. |
| 6 | N-β-hydroxyethyl-tetra hydroquinoline | 0.12 | 23 | 8 hrs | 6 days. |
| 7 | do | 0.18 | 23 | 7 hrs | 5 days. |
| 8 | do | 0.21 | 23 | 5 days | 7 days. |
| 9 | Benzoyl Peroxide | 1.00 | 23 | 5 days | 7 days. |

The cured resin which was polymerized using benzoyl peroxide as a catalyst (Exp. No. 4) contained many fractures. In comparison, when N-β-hydroxyethyl tetrahydroquinoline was used as a catalyst, no fractures were present.

*Example II*

To illustrate the accelerating effect of tertiary amines of the invention when used in conjunction with organic peroxides the following series of tests were performed using a liquid resin solution having the following composition by weight.

| | Per cent |
|---|---|
| Polydiethyleneglycol maleate | 60.000 |
| Styrene monomer | 30.000 |
| Methyl methacrylate monomer | 10.000 |
| Hydroquinone | 0.015 |

Various concentrations of tertiary amines were added to five grams of the above solution containing 0.25% to 1.9% benzoyl peroxide.

| No. | Percent Benzoyl Peroxide | Accelerator | Percent Conc. | Gel time | Time for final cure | Temp. of Test C. |
|---|---|---|---|---|---|---|
| 1 | 1.00 | N-β-Hydroxyethyl-1,2,3,4-tetrahydroquinoline | 0.013 | 4 Min | 15 Min | 25 |
| 2 | 0.50 | N-β-cyanoethyl,-1,2,3,4-tetrahydroquinoline | 0.007 | 18 Min | 30 Min | 25 |
| 3 | 0.25 | N-methyl-1,2,3,4-tetrahydroquinoline | 0.01 | 5 Min | 27 Min | 22 |
| 4 | 0.50 | 1,3-dimethyl indole | 0.07 | 18 hrs | 27 hrs | 23 |

Example III

A polyester of maleic anhydride and glycerol modified with tetrahydrofurfuryl alcohol was prepared by heating 294 grams (3 mols) maleic anhydride with 138 grams (1½ mols) glycerol for 32 minutes at 180° C. in a carbon dioxide atmosphere until a product having an acid number of about 300 was obtained. 306 grams (3 mols) tetrahydrofurfuryl alcohol was added and the mass heated at 155° C. to 200° C. in 1½ hours and at 200° C. to 230° C. for an additional 2¼ hours. The resulting esterification was an amber resinous syrup having an acid number of 50.

A liquid resin was prepared by mixing seventy parts of the above modified polyester with thirty parts styreen monomer. Two-hundredths percent by weight of hydroquinone was added as an inhibitor. The resulting solution was a fluid amber colored liquid. Five-tenths percent by weight of benzoyl peroxide was dissolved in this liquid resin. This resin solution containing five-tenths percent benzoyl peroxide but no tertiary amine required four days at 25° C. to set to a hard solid, part of which was cheesy and weak. The same resin containing 0.50% benzoyl peroxide gelled in 20 minutes at 75° C. and required a total of 25 minutes to set to a hard solid.

With 0.033% of N-β-hydroxyethyl-1,2,3,4. tetrahydroquinoline, 0.5% of benzoyl peroxide and 0.02% of hydroquinone the same resin gelled in 11 minutes and set to a hard solid in 25 minutes at 25° C.

Example IV

A polyester of maleic anhydride and diethylene glycol modified with unsaturated fatty acid was prepared by heating 240 parts of diethylene glycol, 200 parts maleic anhydride and 100 parts of linseed oil fatty acid (Woburn Supra) in a steam of carbon dioxide from 25° C. to 200° C. in one hour and holding at 200° C. for 4 hours. A clear, light, yellow viscous resin was obtained.

A liquid resin solution was prepared by dissolving sixty parts of the above fatty acid modified polyester with forty parts of styrene monomer. One-hundredth of one percent of hydroquinone was added to prevent premature gelation.

When this reactive liquid resin solution was allowed to stand at 25° C. in the presence of 0.50% of benzoyl peroxide, it gelled in five days and was still weak and cheesy at 8 days standing at room temperature. However, when 0.10% of N-β-hydroxyethyl tetrahydroquinoline was thoroughly stirred in, the resulting reactive resin solution gelled within three minutes and set to a hard solid copolymer within thirty minutes. The tensile and compressive strength of this copolymer increased considerably when allowed to age several days at 25° C. The resulting copolymer was very light yellow in color, transparent, free of fractures and bubbles and had good resistance to impact.

Example V

A fluid resin solution was prepared by dissolving 70 parts of polydiethylene glycol maleate (as prepared in Example 1) in 30 parts of diallyl maleate. To this clear solution was added 0.01% of hydroquinone.

When five grams of this resin solution containing 2% by weight of benzoyl peroxide was heated in a small glass vial at 80° C. it required 19 minutes for gelation to occur and 25 minutes to obtain a hard copolymer. Under the same conditions except for the addition of 0.04% of N - β - hydroxyethyl - 1,2,3,4 - tetrahydroquinoline, the copolymer gelled within 3 minutes and was cured to a harder state within 15 minutes. When both experiments were carried out at 23° C., the resin solution containing no tertiary amine required 4 days for gelation to occur.

Example VI 310 parts ethyleneglycol
370 parts phthalic anhydride
245 parts maleic anhydride were heated in an oil bath for 3 hours at an average temperature of 200° C. and five hours at 214° C. A stream of carbon dioxide was bubbled through the reaction solution during the entire run. 74 parts of distillate were collected.

60 parts above ethylene glycol polyester
10 parts vinyl acetate monomer
30 parts styrene monomer were mixed in a suitable receptacle. 0.01% of hydroquinone was added followed by the addition of 0.5% benzoyl peroxide. This resin solution required 7 days at 24° C. for gelation to occur. When 0.075% N-β-hydroxyethyl tetrahydroquinoline was added gelation occurred within six minutes and final cure within one hour at room temperature.

Example VII

Seventy parts diethylene glycol maleate and thirty parts vinyl acetate were mixed in a suitable container. 0.01% hydroquinone and 0.5% benzoyl peroxide were added to the solution. This solution gelled in two days at room temperature. When 0.025% N-β-hydroxyethyl tetrahydroquinoline were added, gelation resulted in 8 minutes and final cure at 20 minutes resulting in a hard, brittle, amber copolymer having several fractures. In the absence of a tertiary aromatic amine but when heated at 75° C., it required 22 minutes for final cure, resulting in an opaque light-colored solid due to the many fine fractures in the solid.

Example VIII

Methyl acrylate was carefully distilled to remove the polymerization inhibitor. One percent benzoyl peroxide was added to the monomer. This solution was still fluid at 4 days at room temperature. When 1 part of N-β-hydroxyethyl tetrahydroquinoline was added to 1000 parts of the freshly made methyl acrylate solution containing 1% benzoyl peroxide, the reaction became vigorous in six minutes, resulting in a transparent, tough, rubbery mass in eight minutes.

Other detailed examples can be given but it is thought that a tabular presentation of results would be more useful. Accordingly, the results obtained with various types of tertiary amines as accelerators for the polymerization and copolymerization of various monomers and mixtures of monomers are given in the following table. In all cases the polymerization inhibitor was removed from the monomer by distillation.

All tests were carried out at room temperature.

| No. | Monomer | Conc. Benzoyl Peroxide, Percent | Accelerator | Percent Conc. | Curing Time | Remarks |
|---|---|---|---|---|---|---|
| 1 | Methyl Acrylate | 1.0 | No accelerator | 0.0 | 4 days | Still fluid. |
| 2 | Vinyl Acetate | 1.0 | do | 0.0 | 4 days | Do. |
| 3 | do | 1.0 | N-β-hydroxyethyl tetrahydroquinoline. | 0.15 | {30 min / 18 hrs} | Viscous fluid; no flow. Clear gel. |
| 4 | Methyl Methacrylate | 1.0 | No accelerator | 0.0 | 9 days | Hard solid. |
| 5 | do | 1.0 | N-β-hydroxyethyl tetrahydroquinoline. | 0.15 | 160 min | Do. |
| 6 | 67% Styrene, 33% Acrylonitrile. | 2.0 | do | 0.10 | 22 hrs | Hard translucent solid. |
| 7 | 67% Styrene, 33% Acrylonitrile. | 2.0 | No accelerator | 0.0 | {4 days / 5 days} | Very viscous; no flow. Hard, solid. |
| 8 | 80% Styrene, 20% Acrylonitrile. | 2.0 | N-β-hydroxyethyl tetrahydroquinoline. | 0.27 | 10 hrs | Hard, solid. |
| 9 | 80% Styrene, 20% Acrylonitrile. | 2.0 | No accelerator | 0.0 | 5 days | Very viscous; no flow. |
| 10 | 50% Vinyl acetate, 50% Acrylonitrile. | 0.5 | N-β-hydroxyethyl tetrahydroquinoline. | 0.10 | {3 Min / 28 Min} | Clouded. Vigorous reaction giving a stringy precipitate. |

Example IX

A polymeric glycol maleate was prepared by heating together 1272 parts of diethylene glycol with 1186 parts of maleic anhydride in an atmosphere of $CO_2$ for eight hours at an average temperature of 205° C. A light yellow, soluble, sticky resin was obtained.

To sixty parts by weight of diethylene glycol maleate were added 10 parts of methylmethacrylate monomer, and thirty parts of styrene monomer to give a clear, light colored, fluid resin solution. One hundredth of one per cent of hydroquinone was added to this solution to prevent premature gelation when in storage.

Example X

A polyester of maleic anhydride and glycerol modified with tetrahydrofurfuryl alcohol was prepared by heating 294 parts of maleic anhydride with 138 parts of glycerol for 32 minutes at 180° C. in an atmosphere of $CO_2$ until a product having an acid number of 300 was obtained. 306 parts of tetrahydrofurfuryl alcohol was added and the mass heated at 155° C. to 200° C. in 1–1½ hours; and at 200° C. to 230° C. for an additional 2¼ hours. The resulting esterification was an amber resinous syrup having an acid number of 50.

A liquid resin composition was prepared by mixing 70 parts of the above polyester with thirty parts of styrene monomer. Two hundredths per cent by weight of hydroquinone was added as an inhibitor to prevent premature gelation in storage.

One per cent by weight of benzoyl peroxide was added to this resin solution. To illustrate the accelerating effect of various concentrations of 1,2,3,4 tetrahydroquinoline, added as a 10% solution in dibutyl phthalate, the following series of tests were made:

| Percent Concentration of Amine | Gelation Time | Time for final cure | Temp. of Expt., C. | Condition of final product |
|---|---|---|---|---|
| 0.04 | 11 min | 23 min | 23 | Hard, yellow. |
| 1.00 | 2 min | 4 min | 23 | Cheesy, amber, weak. |
| 3.00 | 3 min | | 23 | Part cheesy, part fluid. |
| 0.00 | 4 days | 6 days | 22 | Part cheesy, part hard. |

Example XI

A clear fluid resin solution was prepared by dissolving 70 parts of polydiethylene glycol maleate, as prepared in Example 1, in 30 parts of diallyl maleate. To this solution was added 0.01% of hydroquinone followed by the addition of 2.0% by weight of benzoyl peroxide. It required 19 minutes for gelation to occur and 25 minutes to obtain a hard copolymer when five grams of the above resin solution was heated in a closed glass vial at 80° C. Under the same conditions, except for the addition of 0.03% 1,2,3,4-tetrahydroquinoline, the resin solution gelled within twelve minutes and set to a hard copolymer within fourteen minutes.

| Exp. | Percent Benzoyl Peroxide | Accelerator Added | Percent Conc. of Accel. | Time to gel. | Time for Final Cure | Temp. | Remarks |
|---|---|---|---|---|---|---|---|
| A | 0.25 | 1,2,3,4 tetrahydroquinoline | 0.18 | 6 min | 12 min | 22 | Hard, Solid. |
| B | 1.00 | do | 0.60 | 1 min | 4 min | 24 | Weak, Cheesy. |
| C | 0.50 | 2,7 dimethyl 1,2,3,4 tetrahydroquinoline. | 0.12 | 5 min | 16 min | 22 | Hard. |

The composition of the present invention is particularly useful in the low pressure or contact molding process and in the production of solid bodies by casting processes. There is no volatile solvent to be eliminated and virtually all the liquid present is solidified. Whatever inert solvent is present acts as a plasticizer and does not substantially impair the strength or appearance of the finished product. Preferably the polymerization and forming processes are carried out simultaneously (see Example 6, for example) according to the present invention. The composition may be placed in a mold and polymerized and hardened to final form at atmospheric pressure or above and without supplying any extraneous heat. Since high pressures are not necessary the cost of molds is considerably reduced and speed at which the polymerization proceeds with the addition of the catalysts of the present invention permits a reduction of the time in the molds and thus less floor space is required.

Although the examples show that the polymerization process can be carried out in the absence of extraneous heat, heat can be applied if desired and when heat is applied the reaction rate is accelerated. With the catalysts of this invention it is also possible to carry out the polymerization reaction while cooling the reaction mix depending upon the boiling points or volatility of the monomeric compound.

As a practical matter an inhibitor such as hydroquinone (as disclosed in the examples) is preferably added to the condensed alkyd resin ethylenic monomer mix to prevent premature gelation. The polymerization reaction might possibly proceed in the absence of the heterocyclic amine if no inhibitor were present. However, it is desirable to control the reaction by adding the inhibitor. Examples of other inhibitors which may be employed are alphanaphthol, tannic acid, benzaldehyde, etc.

Although certain specific embodiments of this invention have been shown and described, it will be understood that many modifications thereof are possible. This invention, therefore, is not to be restricted except insofar as is necessitated by the prior art and by the spirit of the appended claims.

I claim:

1. In a method of polymerizing a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable that improvement which consists in the step of adding a small but effective amount of N-$\beta$-hydroxyethyl tetrahydroquinoline to promote gelation of the composition.

2. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of N-$\beta$-hydroxyethyl tetrahydroquinoline to promote gelation of the composition.

3. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of N-alkyl-1,2,3,4-tetrahydroquinoline to promote gelation of the composition.

4. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of N-methyl-1,2,3,4-tetrahydroquinoline to promote gelation of the composition.

5. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of 1,2,3,4-tetrahydroquinoline.

6. In a method of controlling the oil phase gelling and polymerization of a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable in the presence of a peroxy polymerization catalyst, said catalyst also being present, that improvement which consists in the step of adding a small but effective amount of 2,7-dimethyl-1,2,3,4-tetrahydroquinoline to promote gelation of the composition.

7. In a method of polymerizing a composition comprising a liquid monomeric unsaturated compound in which the unsaturation is due to a single terminal ethylenic group which is attached to a negative radical and which unsaturated compound is polymerizable in the presence of a peroxy polymerization catalyst, said catalyst also being present, that improvement which consists in the step of adding a small but effective amount of an alkyl substitution derivative of 1,2,3,4-tetrahydroquinoline to promote gelation of the composition.

8. In a method of polymerizing a composition comprising a liquid monomeric unsaturated compound in which the unsaturation is due to a single terminal ethylenic group which is attached to a negative radical and which unsaturated compound is polymerizable in the presence of a peroxy polymerization catalyst, said catalyst also being present, that improvement which consists in the step of adding a small but effective amount of N-β-hydroxyethyl tetrahydroquinoline to promote gelation of the composition.

9. In a method of polymerizing a polymerizable mix comprising a liquid polyhydric alcohol ester of an alpha-olefinic dicarboxylic acid, and a liquid monomeric unsaturated polymerizable compound in which the unsaturation is due to a single terminal ethylenic group which is attached to a negative radical, and in which the said ester is soluble and with which ester it is copolymerizable that improvement which consists in the step of adding a small but effective amount of a compound selected from the group consisting of 1,2,3,4-tetrahydroquinoline and the N-alkyl, N-hydroxyethyl, N-cyanoethyl and 2,7-dimethyl substitution derivatives of 1,2,3,4-tetrahydroquinoline to promote the gelation of the composition.

10. In a method of polymerizing a composition comprising a liquid monomeric unsaturated compound in which the unsaturation is due to a single terminal ethylenic group which is attached to a negative radical and which unsaturated compound is polymerizable in the presence of a peroxy polymerization catalyst, said catalyst also being present, that improvement which consists in the step of adding a small but effective amount of a compound selected from the group consisting of 1,2,3,4-tetrahydroquinoline and the N-alkyl, N-hydroxyethyl, N-cyanoethyl, and 2,7-dimethyl substitution derivatives of 1,2,3,4 - tetrahydroquinoline to promote gelation of the composition.

MAX M. LEE.

References Cited in the file of this patent

UNITED STATES PATENTS

| Number | Name | Date |
|---|---|---|
| 2,466,800 | Fisk | Apr. 12, 1949 |
| 2,480,928 | Hurdis | Sept. 6, 1949 |
| 2,529,315 | Serniuk | Nov. 7, 1950 |